April 28, 1970    W. J. WUCHERPFENNIG    3,508,769
HYDRODYNAMIC PIPE COUPLING
Filed March 12, 1968

INVENTOR
WILLIAM J. WUCHERPFENNIG

BY
ATTORNEY

United States Patent Office 3,508,769
Patented Apr. 28, 1970

3,508,769
HYDRODYNAMIC PIPE COUPLING
William J. Wucherpfennig, Escondido, Calif., assignor to the United States of America as represented by the Secretary of the Army
Filed Mar. 12, 1968, Ser. No. 712,428
Int. Cl. F16l *15/02*
U.S. Cl. 285—165                    1 Claim

ABSTRACT OF THE DISCLOSURE

The disclosure describes an improved telescoping ball-and-socket pipe coupling wherein the telescoping is accomplished by using an annular piston and cylinder. Air leakage through the cylinder allows for shock absorption while permitting temperature expansion and contraction. The cylinder head prevents uncoupling.

BACKGROUND OF THE INVENTION

Field of the invention

This invention relates to a coupling used in joining high temperature pipe lines together, and more particularly to a coupling designed to absorb shocks but which allows for slow expansion within certain limits by the use of hydrodynamic means.

Description of the prior art

An early pipe coupling is disclosed in U.S. Patent No. 1,015,435 issued to W. A. Greenlaw and R. A. Jewett on Jan. 23, 1912. The expansion means disclosed in that patent comprised merely the telescoping of the ends of the intermediate parts, with the friction fit of a packing being used to prevent leakage. Nothing is used by way of a stop member to prevent the coupling from expanding to the point at which it would come apart. Inasmuch as friction alone is the force used in that disclosure to keep the telescoped parts together, the ability of the system to absorb shock transmitted along the axis is negligible. That is, any shock which exceeded the gripping force generated by the friction would result in relative movement of the telescoped parts impeded only by the friction. Inasmuch as any change in volume is negligible when compared with the total volume of the pipes joined by the coupling, no shock absorbance is obtained by the change in volume.

SUMMARY OF THE INVENTION

This invention improves pipe couplings which provide for angular rotation and which utilizes a telescoping fit for contraction and expansion along the coupling's axis, by including at the point where the intermediate members of the coupling telescope together, a means for hydrodynamically absorbing shock transmitted along the axis while still allowing slow relative telescopic movement. In addition, that means serves to prevent uncoupling due to unlimited expansion of the telescoping parts.

Accordingly, it is an object of the invention to provide a pipe coupling capable of hydrodynamically absorbing shock transmitted along the axis of the coupling.

It is a further object of the invention to provide a coupling of the above character which still permits slow telescopic movement, to allow for expansion due to temperature changes.

It is still a further object to provide a coupling of the above character with a stop for limiting the amount of expansion of which it is capable.

Other objects and advantages of the invention will become apparent upon reference to the following drawings and detailed discussion.

DESCRIPTION OF THE PREFERRED EMBODIMENT

Figure 1:
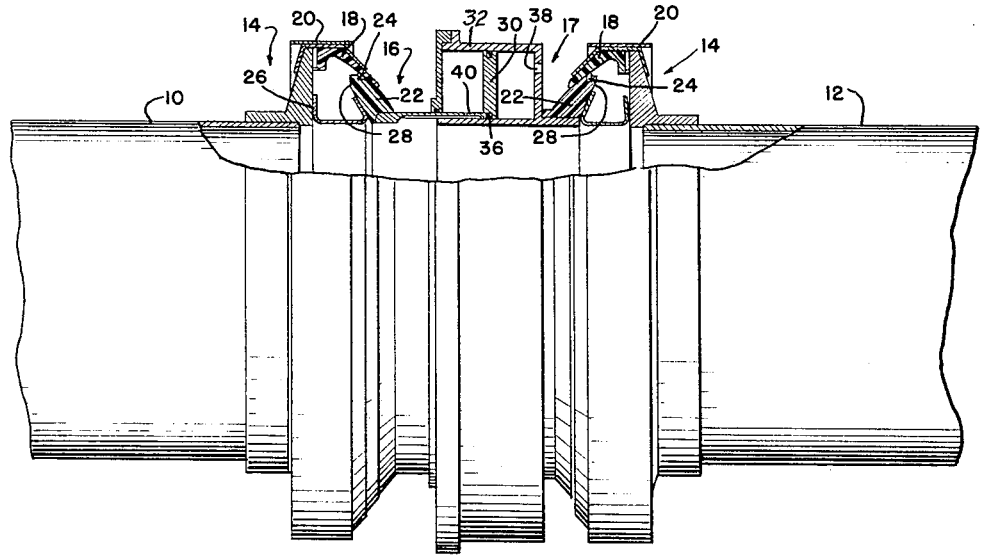
FIG. 1 is a partial section of a coupling constructed according to the invention and coupled to two pipes.
Figure 2:
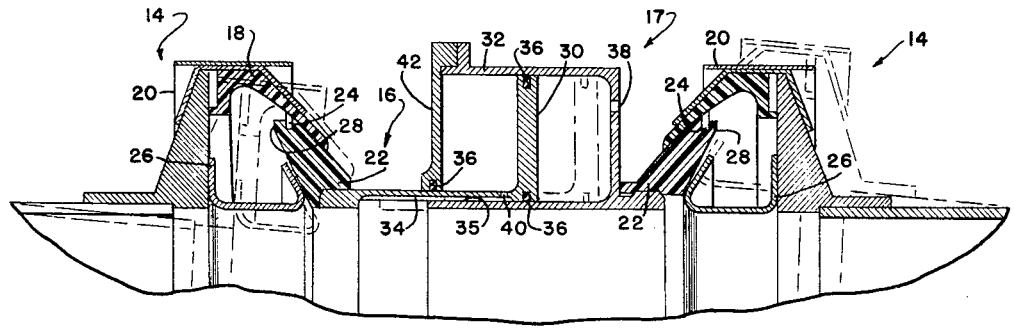
FIG. 2 is an enlargement of the sectional coupling of FIG. 1, showing in phantom the alternate positions of the parts.

FIG. 1 illustrates a coupling constructed according to the invention attached to the ends of two pipes 10 and 12 to couple them together. As in the prior art, the coupling utilizes two end members 14, and two intermediate members 16 and 17 which are telescoped together about a common axis. Both of the members 14 have an annular spherical socket 18 formed of elastic material which is fixed to the member 14 by a V-band and flange coupling 20. Fixed to one end of both the members 16 and 17 is a portion of a ball 22 which extends into the socket 18 to engage the same to provide for motion relative to the socket 18. To prevent leakage, an annular seal 24 is inserted in the ball to wipe the inside of the socket. An annular retaining spring clip 26 insures that the ball 22 will maintain contact with the socket 18 during any swiveling or angular rotation of the end members. In operation, the angular rotation is thus provided for, as shown in FIG. 2, by the sockets 18 moving to engage more or less of the ball 22 depending upon whether that portion of the socket is on the inside or outside of the desired curvature, respectively. The retaining clip 26 slides down or up, respectively, a concave side 28 of the ball 22, with the aforesaid motion of the socket.

In accordance with the invention, the improvement in the preceding prior art coupling includes damper means positioned at the point where the intermediate members telescope together, for hydrodynamically absorbing shock delivered along the axis of the coupling while permitting slow telescopic movement. An annular piston 30 is attached to the telescoping end of the intermediate member 16. Containing the piston and attached to the telescoping end of the other intermediate member is an annular cylinder 32. To insure no rotation of the piston within the cylinder, mating axial grooves 34 and 35 are provided in the telescoping ends of the intermediate members. Piston rings 36 seal the piston to the cylinder. However, to allow the flow of air necessary for slow movement of the piston within the cylinder, a hole 38 is drilled in the cylinder 32 and a hole 40 is drilled in the grooved end of the intermediate member 16.

Accordingly, the piston and cylinder function hydrodynamically to absorb any shock transmitted along the axis of the intermediate members 16 and 17. This includes shock generated by an excessive angular rotation of the end members 14. But the hydrodynamic structure presents no impedance to slow expansion and contraction of the coupling, such as would be caused by temperature changes in a high temperature application. For example, a contracted position of the coupling is illustrated in phantom in FIG. 2.

In addition to the foregoing advantages, the use of a hydrodynamic means insures that there will be a limit to the amount of expansion that can take place within the intermediate members. Thus, cylinder head 42 functions as a stop to limit the movement of the piston so as to prevent the accidental uncoupling of the intermediate members 16 and 17.

While the invention has been described in connection with a preferred embodiment, it will be understood that I do not intend to limit the invention to that described. On the contrary, I intend to cover all alternatives, modifications and equivalents.

I claim:
1. A coupling for connecting two substantially horizontally, axially aligned pipes in end to end relation comprising a pair of first connecting members directly connected to a facing end of each pipe, each of said first connecting members connected to an annular spherical, elastic socket engaging an annular portion of an elastic ball connected to two intermediate members to allow angular rotation of said pair of first connecting members, resilient means disposed between each of said first connecting members and said ball portion connected to each of said intermediate members to maintain said spherical socket and said ball portion in intimate contact, a first one of said pair of intermediate members terminating in an annular piston, the other of said pair of intermediate members terminating in an annular cylinder containing said piston whereby said piston and cylinder combination telescopes together providing means for absorbing shock transmitted along the axis of said intermediate members while allowing a slow telescopic movement of said intermediate members.

References Cited

UNITED STATES PATENTS 209,591  11/1878  Stoddard _____ 285—166

FOREIGN PATENTS 906,955  9/1962  Great Britain.
1,109,361  4/1968  Great Britain.

DAVID J. WILLIAMOWSKY, Primary Examiner

W. L. SHEDD, Assistant Examiner

U.S. Cl. X.R.

285—302